US005198712A

United States Patent [19]

Bolzan, Jr. et al.

[11] Patent Number: 5,198,712

[45] Date of Patent: Mar. 30, 1993

[54] CARTRIDGE BRUSH ASSEMBLY

[75] Inventors: James J. Bolzan, Jr., Baldwin; Douglas L. Kreiser, Towson; Terry L. Turner, Finksburg, all of Md.

[73] Assignee: Black & Decker Inc., Newark, Del.

[21] Appl. No.: 880,812

[22] Filed: May 8, 1992

[51] Int. Cl.[5] ........................ H02K 13/00; H02K 5/14

[52] U.S. Cl. .................................. 310/242; 310/239; 310/247

[58] Field of Search .............. 310/238, 239, 242, 245, 310/247, 249

[56] References Cited

U.S. PATENT DOCUMENTS

| | | | |
|---|---|---|---|
| 1,318,713 | 10/1919 | Aalborg | 310/247 |
| 2,474,601 | 6/1949 | Thomas | 310/247 |
| 2,615,939 | 10/1952 | Mitchell | 310/247 |
| 2,683,829 | 1/1950 | Gerber | 310/246 |
| 2,870,355 | 1/1959 | Rohrbach | 310/247 |
| 4,266,155 | 5/1981 | Niemela | 310/247 |
| 4,876,475 | 10/1989 | Smith | 310/239 |

FOREIGN PATENT DOCUMENTS

| | | | |
|---|---|---|---|
| 0889941 | 7/1949 | Fed. Rep. of Germany | 310/247 |
| 1436156 | 11/1988 | U.S.S.R. | 310/242 |
| 2195835 | 4/1988 | United Kingdom | 310/242 |

*Primary Examiner*—Emanuel T. Voeltz
*Assistant Examiner*—C. La Balle
*Attorney, Agent, or Firm*—Dennis A. Dearing; John D. Del Ponti; Charles E. Yocum

[57] ABSTRACT

A cartridge brush assembly for fractional horse power commutated motors comprises an elongated tubular holder 17 with opposed sidewalls 31, 33 spaced transverse to a commutator rotational axis 15. A brush 19 is slidably mounted in holder 17 and protrudes through a mouth 35 of holder 17 for engaging a commutator 13. A guide 21 is slidably mounted in holder 17 and comprises a pair of spaced rounded feet 57, 59 slidably and pivotally engaging a chamfered rear face 49 of brush 19. A spring 23 biases a transversely spaced brush sidewall 45 against a transversely spaced holder sidewall 31 and biases brush 19 into engagement with commutator 13. The brush assembly reduces chattering and misalignment of the brush over the life of the brush.

9 Claims, 3 Drawing Sheets

FIG. 5A
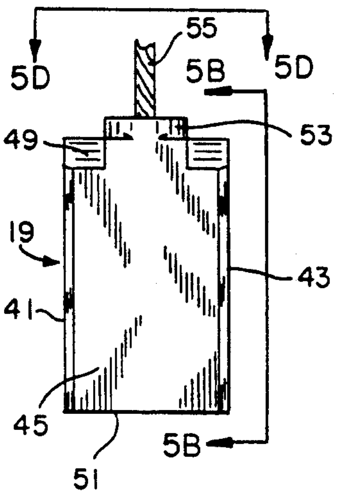
FIG. 5B
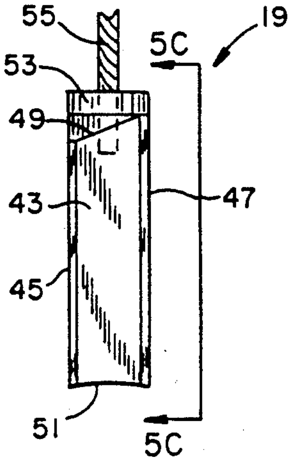
FIG. 5C
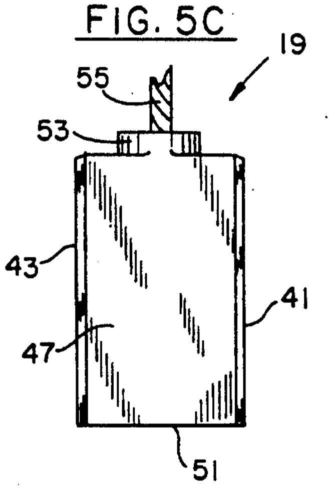
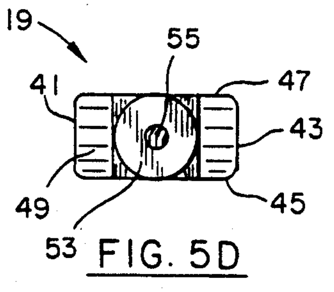
FIG. 5D
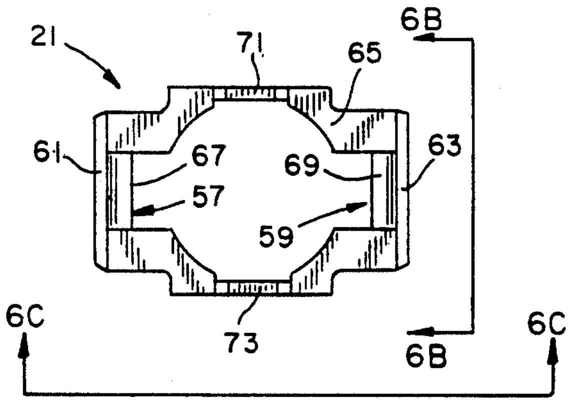
FIG. 6A
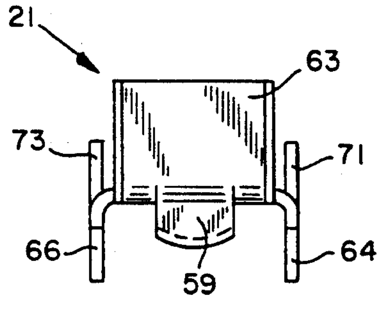
FIG. 6B
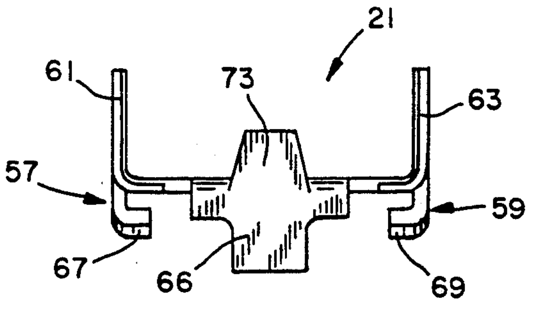
FIG. 6C

CARTRIDGE BRUSH ASSEMBLY

FIELD OF THE INVENTION

This invention relates to commutated motors and more particularly to an improved cartridge type brush assembly for such motors.

BACKGROUND OF THE INVENTION

Small universal and permanent magnet motors typically use a cartridge type brush assembly that rides on the commutator and electrically connects the motor power supply to the armature through the commutator. The assembly comprises a tubular holder and a brush axially slidable in the holder and protruding through a mouth at one end of the holder to engage a motor commutator. The brush is biased toward the commutator by a helical coil spring which has the coils at one end surrounding a neck of the brush. Such brush assemblies have been found to be subject to chattering (i.e., vibrating or bouncing) of the brush on the commutator responsive to commutator rotation. Chattering is objectional because it generates electrical noise and reduces brush life due to arcing between the brush and commutator. Also, poor and uneven contact of the brush on the commutator can cause uneven wear and grooving of the commutator. This can reduce the life of the currently installed brush and also of replacement brushes because of a mismatch between the new brush shape and the unevenly worn commutator surface. An unevenly worn commutator can further cause a new brush to burn the commutator (due to arcing) because of an extreme mismatch between the brush and commutator surfaces.

Another problem that results from poor contact between the brush and commutator occurs particularly in portable power tools such as circular saws which use a dynamic motor brake such as disclosed in U.S. Pat. No. 5,063,319. Two important criteria for evaluating brake performance are certainty of the application of the brake and the time required for the brake to completely stop blade rotation. Over the life of the brushes, poor contact can cause brake actuation to be less reliable and braking time to vary.

As disclosed, e.g., in U.S. Pat. Nos. 2,474,601 and 2,615,939, chattering of the brush can be mitigated by providing a force normal to the axis of the brush and acting in the direction of rotation of the commutator to hold the brush against the side of the brush holder. Such a force can be provided by beveling the rear face (engaged by the helical spring) of the brush so that the face is inclined with respect to the brush axis and the force exerted by the spring includes both an axial and normal components relative to the holder axis. However, because of the criticality of achieving low levels of chattering particularly in products with dynamic brakes, further improvements in the reduction of chattering than have been achievable with prior art systems are desirable.

SUMMARY OF THE INVENTION

In accordance with the present invention, as embodied and described herein, a brush assembly is provided for a motor having a commutator rotatable about a first axis. The assembly comprises an elongated tubular holder having opposed sidewalls spaced transverse to the commutator axis. A brush is slidably mounted in the holder and protrudes through a mouth of the holder for engaging the commutator. The brush has a pair of sidewalls axially spaced relative to the commutator axis and a pair of sidewalls transversely spaced relative to the commutator axis. A guide is slidably mounted in the holder and comprises a pair of spaced rounded feet slidably and pivotally engaging a chamfered rear face of the brush at spaced sidewalls. A helical spring extending between one end of the brush holder and the guide biases one of the transversely spaced brush sidewalls against one of the transversely spaced holder sidewalls and biases the brush into engagement with the commutator.

To enhance the seating and stability of the engagement between the guide feet and the brush, the guide feet are preferably generally cylindrical sections having a longitudinal axis parallel to the commutator axis. This permits the feet to roll, pivot and slide on the chamfered rear brush face thereby reducing chattering by maintaining accurate and flush engagement of the transversely spaced brush sidewall against the transversely spaced holder sidewall. The engagement of the guide feet with the brush at locations adjacent to the axially spaced brush sidewalls enhances the lateral stability (in the direction of the commutator axis) of the brush.

To pilot the helical spring and stably support the spring relative to the brush, the guide may have a collar which surrounds, but is not in contact with, a neck extending from the rear brush face.

To guide movement of the guide within the holder, the guide preferably has a pair of spaced sidewalls extending axially in the holder and rearwardly from the brush.

To provide a direct electrical connection between the brush and holder, a shunt extends between the brush neck and the holder end wall. By providing the brush/-shunt electrical connection within a neck which brush length is permitted resulting in longer brush life.

Additional objects and advantages of the invention will be apparent from the detailed description of the preferred embodiment, the appended claims and the accompanying drawings or may be learned by the practice of the invention.

BRIEF DESCRIPTION OF THE DRAWINGS

In FIG. 1, the brush holder is shown in longitudinal cross-section and the brush and guide are shown in side elevation. To expose the interior of the holder, the brush is shown fully extended from the holder.

FIG. 5A is a side elevational view of the brush for the assembly of FIG. 1.

FIG. 5B is a side elevational view taken of the brush taken along line 5B—5B of FIG. 5A.

FIG. 5C is a side elevational view of the brush taken along line 5C—5C of FIG. 5B.

FIG. 5D is a top plan view of the brush taken along line 5D—5D of FIG. 5A.

FIG. 6A is a top plan view of the guide of the brush assembly of FIG. 1.

FIG. 6B is a side elevational view of the guide taken along line 6B—6B of FIG. 6A.

FIG. 6C is a side elevational view of the guide taken along line 6C—6C of FIG. 6A.

DESCRIPTION OF THE PREFERRED EMBODIMENT

The preferred embodiment of a brush assembly 11 in accordance with the present invention is illustrated in FIGS. 1-4. A brush 19 for the assembly is illustrated in FIGS. 5A-5D. A guide 21 for the assembly is illustrated in FIGS. 6A-6C.

Figure 1:
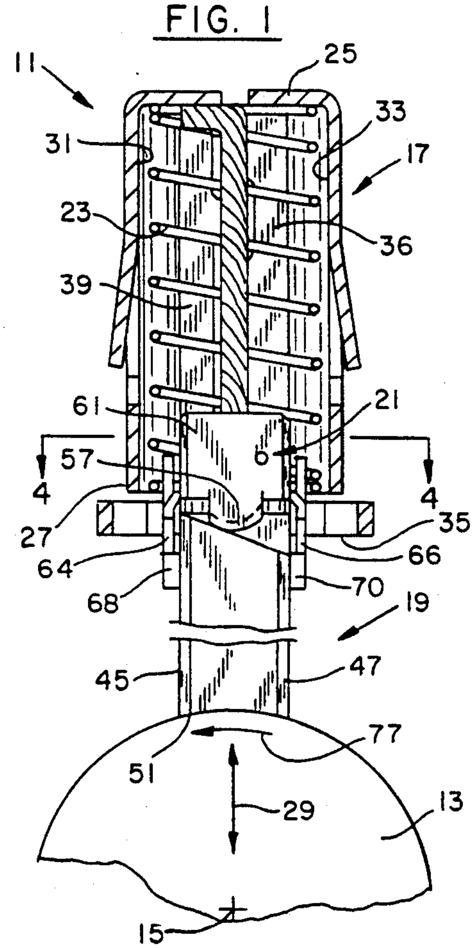
FIG. 1 is a side view partially in cross-section of a brush assembly in accordance with the present invention.

As best shown in FIG. 1, brush assembly 11 in accordance with the preferred embodiment is used in a motor (not shown) having a commutator 13 rotatable about a first axis 15 and serves to conduct current from a motor power supply (not shown) to the armature windings (not shown) of the motor. The types of motors in which the brush assembly finds primary application are commutated fractional horse power motors such as reversible, universal and permanent magnet motors. One particularly important application for a motor incorporating the present brush assembly is in portable power tools such as circular saws which use dynamic braking as disclosed in U.S. Pat. No. 5,063,319.

In brief, brush assembly 11 comprises an elongated holder 17, a brush 19, a guide 21 and a spring 23. In accordance with the invention and best shown in FIGS. 1, 2, holder 17 has opposed ends 25, 27; a longitudinal axis 29 extending between ends 25, 27 and opposed sidewalls 31, 33 spaced transverse to commutator axis 15. A mouth 35 is formed at one opposed end of holder 17. As embodied herein, a channel 36 is formed centrally within holder 17 and is defined by ends 25, 27, sidewalls 31, 33 and opposed sidewalls 37, 39 spaced in a direction parallel to commutator axis 15. As is well known, holder 17 is rigidly fixed to the motor stator (not shown) and relative to commutator 13 through a support (not shown). Holder 17 is made of an electrically conductive material such as brass and is electrically connected to the motor field windings (not shown) through a terminal 40 which is shown only in fragmentary form in FIG. 2 (for convenience). End 25 may be formed by end walls integrally formed with sidewalls 31, 33 or alternatively in an embodiment (not shown) may be formed by a conductive disc which is seated against an inner wall of a threaded cap. By removal of the threaded cap, brush 19 may be replaced through end 25.

In accordance with the invention herein, a brush 19 (FIGS. 3-5) is slidably mounted in holder 17 and protrudes through mouth 35 of holder 17 for engaging commutator 13. Brush 19 has a pair of sidewalls 41, 43 axially spaced relative to commutator axis 15 and a pair of sidewalls 45, 47 transversely spaced relative to commutator axis 15, a chamfered rear face 49 and a front face 51 for engaging commutator 13. As embodied herein, to provide a direct electrical connection between holder 17 and brush 19, a shunt 55 extends from a neck 53 extending from rear brush face 49 toward the closed end 25 of holder 17. Shunt 55 is electrically connected (by spot welding) to holder 17 at end 25. When end 25 is constituted by a conductive disc and a threaded cap (both not shown), shunt 55 is anchored to the metal disc to permit replacement of the brush within the holder.

Figure 2:
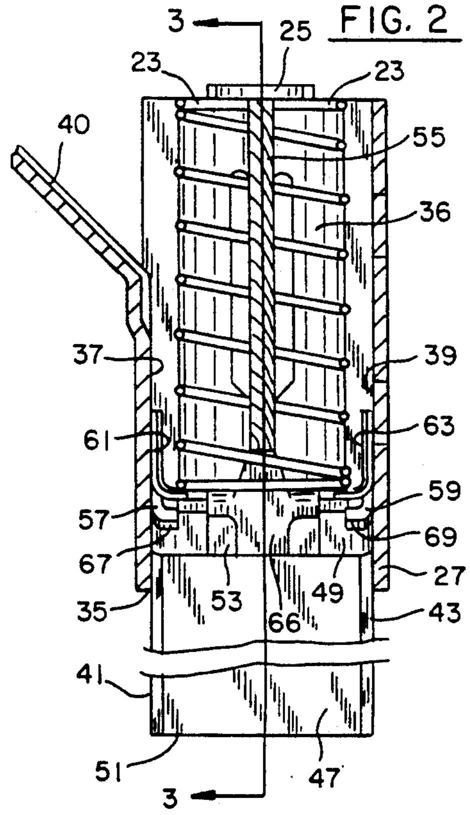
FIG. 2 is a side view partially in cross-section of the brush assembly of FIG. 1. The view is taken from the right side in FIG. 1. Again, the holder is shown in longitudinal cross-section and the guide and brush are shown in side elevation.
Figure 3:
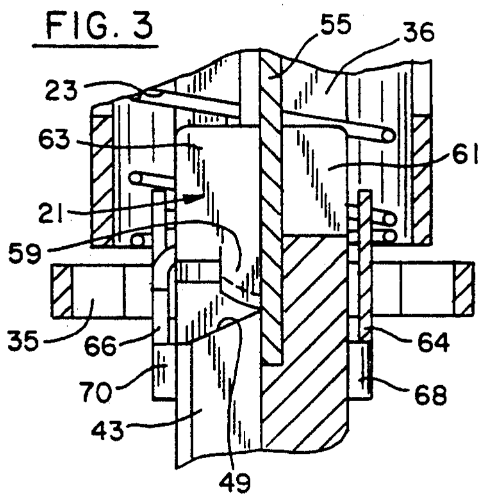
FIG. 3 is a fragmentary cross-section of the brush assembly taken along line 3—3 of FIG. 2. However, for illustrative purposes, the left side of the guide and brush are shown in side elevation and the right side of the guide and brush are shown in cross-section.
Figure 4:
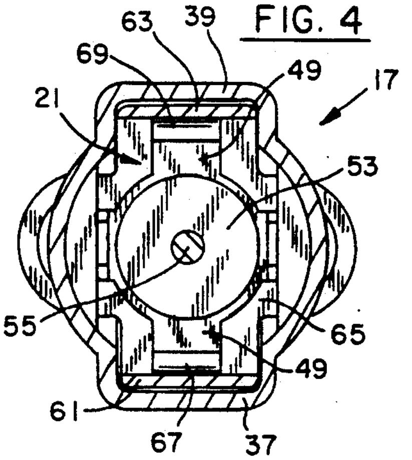
FIG. 4 is a cross-sectional view taken along line 4—4 of FIG. 1. For clarity, the spring is omitted.

In accordance with the invention herein, guide 21 (FIGS. 1-4, 6) is slidably mounted in holder 17 and comprises a pair of spaced rounded feet 57, 59. Feet 57, 59 slidably and pivotably engage chamfered rear face 49 of brush 19 at spaced locations (FIG. 2) adjacent to the axially spaced brush sidewalls 41, 43. As embodied herein, guide 21 has a spaced pair of sidewalls 61, 63 extending axially in holder 17 and rearwardly from brush 19 for guiding sliding movement of guide 21 within holder 17. To pilot helical spring and to stably support spring 23 relative to brush 19, guide 21 has a collar 65 with a pair of upturned stays 71, 73 which centrally locate spring 23 on the longitudinal axis 29 of holder 17. Collar 65 has a central opening 75 that surrounds but is not in contact with neck 53. Opening 75 must be sufficiently spaced from neck 53 so that guide 21 may shift relative to chamfered rear face 49 as brush 19 wears and spring 23 extends. By providing the brush/shunt electrical connection within neck 53 which is telescoped within spring 23 and guide collar 65, the greatest usable brush length is permitted resulting in longer brush life. Use of the brush 19 must be stopped before shunt 55 engages commutator 13 as brush 19 wears to avoid scarring the commutator surface. Travel of brush 19 from holder 17 is limited by the engagement of guide tabs 64, 66 with stops 68, 70 formed in holder sidewalls 31, 33. In FIGS. 1, 2, brush 19 is shown in its fully extended position in which tabs 64, 66 engage stops 68, 70.

Each guide foot 57, 59 extends axially and transversely of holder axis 29 from opposite sides 61, 63 of collar 65. To ensure that guide remains accurately and stably seated on brush face 49, each foot 57, 59 has a curved sole 67, 69 which is rollable on rear brush face 49 and preferably is constituted by a generally cylindrical section having a longitudinal axis parallel to commutator axis 15.

Figure 7:
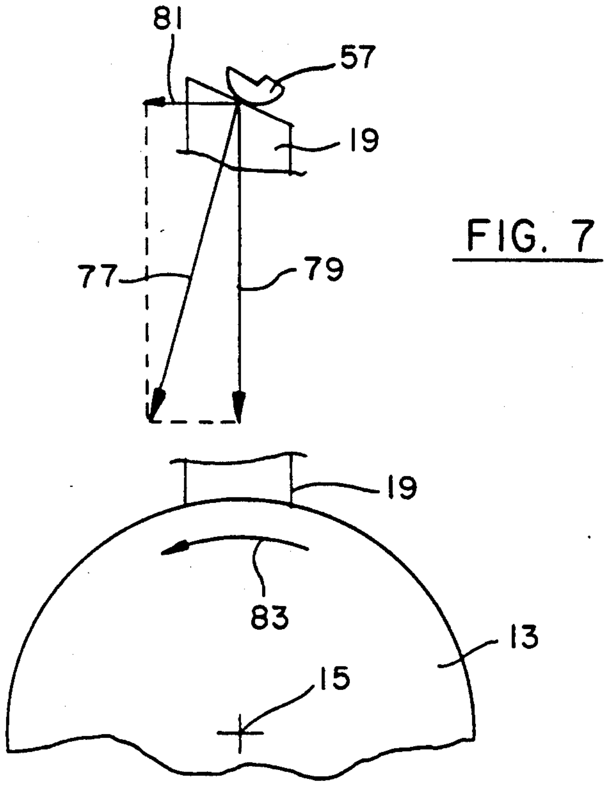
FIG. 7 is a diagram of the resultant forces applied to the brush by the spring in the brush assembly of FIG. 1.

In accordance with the invention, helical spring 23 (FIGS. 1-3) extends between holder end 25 and guide 21 for biasing one of the transversely spaced brush sidewalls 45, 47 against one of the transversely spaced holder sidewalls 31, 33 and for biasing brush 19 into engagement with commutator 13. As embodied herein, spring 23 (FIG. 7) exerts a force 77 against brush 19 through guide 21 which has one component 79 parallel to holder axis 29 and second component 81 perpendicular to axis 29 and directed toward holder sidewall 31. If the motor is unidirectional, optimally the normal force component 81 is directed in the direction 83 of rotation of commutator 13. If the motor is reversible, component 81 should be directed in the primary direction of rotation of commutator 13. The brush assembly of the present invention provides a number of advantages. The normal component 81 of the force 77 biases brush sidewall 45 into resilient engagement with holder sidewall 31 to prevent chattering and to prevent cocking or misalignment of brush 19 within holder 17. The wide spacing of feet 57, 59 on rear face 49 adjacent respectively to axially spaced brush sidewalls 41, 43 provides lateral stability in a direction parallel to commutator axis 15. Lateral stability is particularly critical when the brush length is short as a result of wear. With shorter brush lengths, the sidewalls of the holder 17 have less and less control on the alignment of the brush. Furthermore by providing curved feet which extend parallel to commutator axis 15, guide 21 is rollable or pivotable and slidable on rear face 49 so that guide 21 maintains an accurate firm seating on rear face 49 and retains brush sidewall 45 in engagement with holder sidewall 31. As a result, misalignment and rapid wear of the brush is avoided. Misalignment of the brush can lead to wedging of the brush within holder 17 and can result in rapid uneven wearing of the brush and/or grooving of the commutator.

It will be apparent to those skilled in the art that various modifications and variations can be made in the brush assembly of the present invention without departing from the scope or spirit of the invention. Thus, it is intended that the present invention covers these modifications and variations provided they come within the scope of the appended claims and their equivalence.

We claim:

1. A brush assembly for a motor having a commutator rotatable about a first axis, the assembly comprising:

an elongated tubular holder having opposed ends, a longitudinal axis extending between the ends, opposed sidewalls spaced transverse to the commutator axis and a mouth at one opposed end;

a brush slidably mounted in the holder and protruding through the mouth of the holder for engaging the commutator;

the brush having a pair of sidewalls axially spaced relative to the commutator axis and a pair of sidewalls transversely spaced relative to the commutator axis, a chamfered rear face and a front face for engaging the commutator;

a guide slidably mounted in the holder and comprising a pair of spaced rounded feet slidably and pivotably engaging the chamfered rear face of the brush at spaced locations adjacent to the axially spaced brush sidewalls; and a helical spring extending between the brush holder end and the guide (1) for biasing one of the transversely spaced brush sidewalls against one of the transversely spaced holder sidewalls and (2) for biasing the brush into engagement with the commutator.

2. The assembly of claim 1 wherein the guide feet are generally cylindrical sections having a longitudinal axis parallel to the commutator axis.

3. The assembly of claim 1 wherein:

the brush has a neck extending from the rear brush face toward the closed end of the holder and has a shunt extending from the neck and electrically connected to the holder; and the guide has a collar surrounding and spaced from the neck for centrally locating the spring on the longitudinal axis of the holder.

4. The assembly of claim 3 wherein each foot extends from opposite sides of the collar axially and transversely of the holder axis.

5. The assembly of claim 1 wherein the guide has a spaced pair of sidewalls extending axially in the holder and rearwardly from the brush and has a collar for centrally locating the spring along the longitudinal axis of the holder.

6. A brush assembly for a motor having a commutator rotatable about a first axis, the assembly comprising:

an elongated holder having a brush channel having (1) a longitudinal axis, (2) opposed sidewalls spaced transversely to commutator axis, (3) opposed sidewalls spaced in a direction parallel to the commutator axis, and (4) a mouth at one end of the channel;

a brush slidably mounted in the channel and comprising (1) a chamfered rear face, (2) a front face extending through the mouth of the channel for engaging the commutator, (3) a neck extending from the rear brush face toward the closed end of the holder and (4) a shunt extending from the neck and electrically connected to the holder, (5) a pair of sidewalls axially spaced relative to the commutator axis and (6) a pair of sidewalls transversely spaced relative to the commutator axis; and a guide slidably mounted in the channel and comprising (1) a collar surrounding the neck and (2) a pair of feet axially spaced relative to the commutator axis and slidably engaging the chamfered rear face of the brush at respective locations adjacent to the axially spaced brush sidewalls; and a helical spring (1) extending between the brush holder end and the guide, (2) biasing one of the transversely spaced brush sidewalls against one of the transversely spaced holder sidewalls, and (3) biasing the brush outwardly through the channel mouth.

7. The brush assembly of claim 6 wherein the feet are curved and are rollable on the rear brush face.

8. The brush assembly of claim 6 wherein each foot is a cylindrical section having a longitudinal axis parallel to the commutator axis and extending axially and transversely from the collar.

9. The brush assembly of claim 6 wherein:

the guide has a pair of spaced sidewalls slidably engaged respectively with the axially spaced sidewalls of the brush channel; and the spring is supported on the collar for centrally locating the spring along the longitudinal axis of the holder.

* * * * *